United States Patent

Allen et al.

[11] 3,891,679
[45] June 24, 1975

[54] PRODUCTION OF 2,2-DISUBSTITUTED PROPIOLACTONES

[75] Inventors: Robert P. Allen; Hugh J. Hagemeyer, Jr., both of Longview, Tex.

[73] Assignee: Eastman Kodak Company, Rochester, N.Y.

[22] Filed: Nov. 3, 1972

[21] Appl. No.: 303,570

[52] U.S. Cl. ............................................ 260/343.9
[51] Int. Cl. .............................................. C07d 3/00
[58] Field of Search ................................. 260/343.9

[56] References Cited
UNITED STATES PATENTS
3,436,406  4/1969  Nakahara et al. ............... 260/343.9

FOREIGN PATENTS OR APPLICATIONS
1,965,001  7/1971  Germany ......................... 260/343.9

Primary Examiner—Donald G. Daus
Assistant Examiner—Anne Marie T. Tighe
Attorney, Agent, or Firm—Edward R. Weber; Cecil D. Quillen, Jr.

[57] ABSTRACT

The present invention relates to a process for the manufacture of 2,2-disubstituted propiolactones via the pyrolysis of methylene diisoalkylate in the vapor phase over a fixed bed catalyst system. The reaction of the invention is as follows:

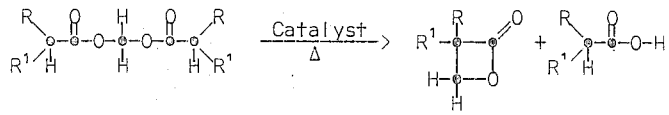

wherein R is an alkyl group of from 1 to 4 carbon atoms and $R^1$ is an alkyl group of from 1 to 4 carbon atoms or a phenyl group. The process is operable at temperatures from about 240°C. to about 360°C. with contact times ranging from about 0.1 second to about 30.0 seconds. The gaseous ester feed may, if desired, be diluted with an inert gas such as nitrogen and the reactor may be run at atmospheric pressure or reduced pressure. Both acidic and basic catalysts have been found effective in this pyrolysis.

22 Claims, No Drawings

PRODUCTION OF 2,2-DISUBSTITUTED PROPIOLACTONES

The present invention relates to a process for preparing 2,2-disubstituted propiolactones by the pyrolysis of a methylene diisoalkylate in the vapor phase over a fixed bed catalyst.

2,2-disubstituted propiolactones are useful in the polymer industry as starting material for synthetic resins and synthetic fibers. They are also useful in the pharmaceutical industry and have heretofore been prepared by a variety of methods. For example, in U.S. Pat. NO. 2,356,459 there is described a well-known method for preparing 2,2-disubstituted propiolactones by the addition reaction of dimethyl ketene and formaldehyde. The known methods for the manufacture of 2,2-disubstituted propiolactones, however, can be practiced on a commercial scale only with difficulties and result in economic disadvantages.

It is therefore an object of our invention to provide a simplified method for the preparation of 2,2-disubstituted propiolactones.

It is another object to provide a one-step method for the preparation of 2,2-disubstituted propiolactones.

Other objects of the invention will become apparent from a consideration of the specification and claims of this application.

The reaction of this invention is believed to proceed according to the following formula

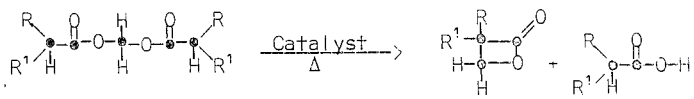

wherein R is an alkyl group of from 1-4 carbon atoms and R¹ is an alkyl group of 1-4 carbon atoms or a phenyl group. The reaction is operable at temperatures of from about 240°C. to about 360°C. at contact times ranging from about 0.1 second to about 30 seconds. Both acidic and basic catalysts have been found to be effective.

There is no known prior art which discloses or predicts this reaction process. Known methods to produce pivalolactone by transesterification require the presence of the neopentyl structure to effect ring closure as illustrated below:

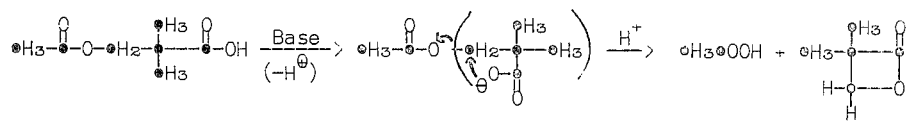

No chemical mechanism is known which would suggest that a "neo" structure could be formed from the methylene diisoalkylate starting material and subsequently rearranged to form 2,2-disubstituted propiolactone. Likewise, no literature is known which would suggest any method in which methylene esters could be cyclized to form β-lactones. It was, therefore, quite unexpected that 2,2-disubstituted propiolactones could be produced from methylene diesters in a one-step catalyzed vapor phase process. The actual mechanics of the invention are still unknown. However, two theories on the bond shifting that occurs are illustrated by the chemistry that follows:

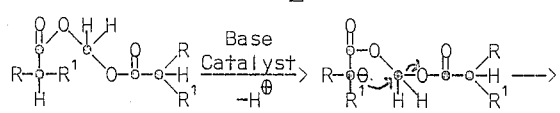

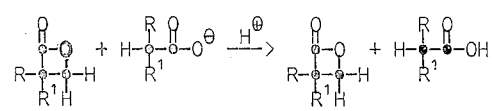

Base Catalyzed Rearrangement

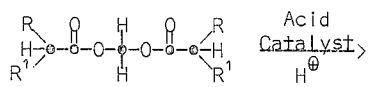

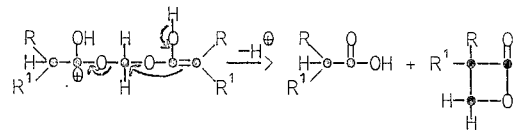

Acid Catalyzed Rearrangement

As discussed hereinabove, in the process of the instant invention a gem diester having the formula

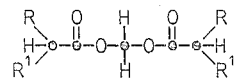

is pyrolyzed in the vapor phase over a solid catalyst at a temperature of from about 240°C. to about 360°C with a contact time of from about 0.1 second to about 30 seconds. The gaseous ester feed may, if desired, be diluted with an inert gas to facilitate feeding of the reactants, control of contact time, etc. Good results are obtained at atmospheric pressure using an inert diluent gas, usually in a molar ratio of gas to organic feed of from about 1:10 to about 20:1, preferably about 1:1 to 6:1, and most preferably about 3:1 to 4:1. A suitable inert diluent gas is any gas which does not react with either the reactants or the products under the conditions of the reaction, such as $N_2$, argon, helium, gaseous hydrocarbons and compounds which are readily vaporized, such as benzene. The reaction may be conducted at atmospheric pressure or reduced pressure. Reduced pressure may be used to facilitate vaporization of the reactants and/or products. Reaction products comprise a 2,2-disubstituted propiolactone having the formula

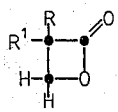

and an organic acid having the formula

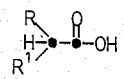

In all the above formulas R can be any straight or branched chain, saturated alkyl group containing 1-4 carbon atoms and $R^1$ is a straight or branched chain saturated alkyl group containing 1-4 carbon atoms or a phenyl group.

The reaction is catalyzed by either an acidic or a basic type of catalyst. Virtually any acidic or basic catalyst will work so long as it is not removed in significant amounts in the product stream. Typical catalysts that are useful in this synthesis are silica-alumina, silica gel, one percent sodium carbonate on Celatom, five percent potassium hydroxide on Celatom, lanthanum oxide on silica gel, 12-tungstosilicic acid on silica gel, and titania. The preferred acid catalyst is silica-alumina while the preferred basic catalyst is lanthanum oxide on silica gel.

The process may be operated at temperatures of from about 240°C. to about 360°C. Temperatures and pressures selected should be sufficient to assure vaporization of the feed material and the products. A preferred embodiment utilizes a silica-alumina catalyst at a temperature of from about 270°C. to about 290°C.

Suitable diester feed materials include methylene diisobutyrate, methylene bis(dibutyl acetate), methylene bis($\alpha$-methyl hexanoate), methylene bis(methyl phenyl acetate), methylene bis(butyl phenyl acetate), and the like.

Reaction time will depend upon the catalyst and the temperature utilized but will normally be in the range of from about 0.1 second to about 30 seconds and preferably about 0.5 second to about 10 seconds.

The process of the invention is illustrated in greater detail by the following examples, but it will be understood that these examples are not intended to limit the invention in any way and obvious modifications will occur to those skilled in the art. All examples are run at atmospheric pressure in a 2 foot by 22 mm. Vycor reactor.

EXAMPLE 1

This example demonstrates a method for the preparation of methylene diisobutyrate. To a two liter flask is added 7 moles of paraformaldehyde, 7.35 moles of isobutyric anhydride, 2.8 moles of isobutyric acid, and 2.0 grams of sulfuric acid. This mixture is reacted with stirring at 150°C. for 16 hours. The reaction mixture is distilled on a 15-plate column with 1182 grams of methylene diisobutyrate being recovered at 96°–100°C. at 20 mm. pressure. This represents a 90 percent yield and conversion based on paraformaldehyde.

EXAMPLE 2

This example illustrates the preparation of pivalolactone over an acidic catalyst.

Methylene diisobutyrate is fed to a pyrolysis tube which contains a silica-alumina catalyst and inert packing. The temperature of the catalyst bed and inert material is maintained at 290° ± 20°C, insuring that no liquid material will impinge on the catalyst surface. Nitrogen is used as a diluent and sweep gas. With a contact time of 5 seconds pivalolactone is produced in a 12 percent conversion.

EXAMPLE 3

This example illustrates the preparation of pivalolactone over a basic catalyst.

Methylene diisobutyrate is fed to a pyrolysis tube which contains a catalyst consisting of lanthanum oxide deposited on silica gel and inert packing. The temperature of the catalyst bed and inert material is maintained at 300° ± 15°C, insuring that no liquid material will impinge on the catalyst surface. Nitrogen is used as a diluent and sweep gas. With a contact time of 2 seconds pivalolactone is produced in a 5 percent conversion.

EXAMPLE 4

This example illustrates the catalyst dependence of the reaction.

Methylene diisobutyrate is fed to a pyrolysis tube packed with Vycor chips. At 335° ± 10°C. the methylene diisobutyrate is recovered unchanged.

The invention has been described in detail with particular reference to preferred embodiments thereof, but it will be understood that variations and modifications can be effected within the spirit and scope of the invention as described hereinabove.

We claim:

1. A process for producing 2,2-disubstituted propiolactone having the formula

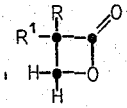

which comprises the steps of pyrolyzing a methylene diester having the formula

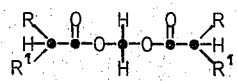

wherein R is alkyl having 1-4 carbon atoms and $R^1$ is alkyl of from 1-4 carbon atoms or phenyl at a temperature of from about 240°C. to about 360°C. in the presence of a catalyst selected from the group consisting of silica-alumina, silica gel, sodium carbonate on Celatom, potassium hydroxide on Celatom, lanthanum oxide on silica gel, 12-tungstosilicic acid on silica gel, and titania.

2. The process of claim 1 wherein the methylene diester is selected from the group consisting of methylene diisobutyrate, methylene bis(dibutyl acetate), methylene bis($\alpha$-methyl hexanoate), methylene bis(methyl phenyl acetate), methylene bis(butyl phenyl acetate).

3. The process of claim 1 wherein the catalyst is silica-alumina.

4. The process of claim 1 wherein the catalyst is lanthanum oxide on silica gel.

5. The process of claim 1 wherein the pyrolysis is conducted at the temperature of from about 270°C. to about 310°C.

6. The process of claim 1 wherein the pyrolysis is conducted at atmospheric pressure.

7. The process of claim 1 wherein the pyrolysis is conducted at reduced pressure.

8. A process for producing pivalolactone which consists essentially of the steps of pyrolizing methylene diisobutyrate at a temperature of from about 240°C. to about 360°C. in the presence of a catalyst selected from the group consisting of silica-alumina, silica gel, sodium carbonate on Celatom, potassium hydroxide on Celatom, lanthanum oxide on silica gel, 12-tungstosilicic acid on silica gel, and titania.

9. The process of claim 8 wherein the catalyst is silica-alumina.

10. The process of claim 8 wherein the catalyst consists of lanthanum oxide on silica gel.

11. The process of claim 9 wherein the pyrolysis is conducted at a temperature of from about 270°C. to about 310°C.

12. The process of claim 9 wherein the pyrolysis is conducted at atmospheric pressure.

13. The process of claim 9 wherein the pyrolysis is conducted at reduced pressure.

14. A process for producing 2,2-disubstituted propiolactone having the formula

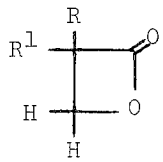

whereby a methylene diester having the formula

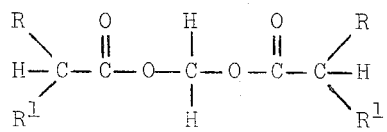

wherein R is alkyl having 1-4 carbon atoms and $R^1$ is alkyl of from 1-4 carbon atoms or phenyl, is pyrolyzed in the presence of a catalyst selected from the group consisting of silica-alumina, silica gel, one percent sodium carbonate on Celatom, five percent potassium hydroxide on Celatom, lanthanum oxide on silica gel, 12-tungstosilicic acid on silica gel, and titania, at a temperature of from about 240°C. to about 360°C.

15. The process of claim 14 wherein the methylene diester is selected from the group consisting of methylene diisobutyrate, methylene bis(dibutyl acetate), methylene bis($\alpha$-methyl hexanoate), methylene bis(methyl phenyl acetate), methylene bis(butyl phenyl acetate).

16. The process of claim 14 wherein the pyrolysis is conducted at a temperature of from about 270°C. to about 310°C.

17. The process of claim 14 wherein the pyrolysis is conducted at atmospheric pressure.

18. The process of claim 14 wherein the pyrolysis is conducted at reduced pressure.

19. A process for producing pivalolactone wherein methylene diisobutyrate is pyrolyzed in the presence of a catalyst selected from the group consisting of silica-alumina, silica gel, one percent sodium carbonate on Celatom, five percent potassium hydroxide on Celatom, lanthanum oxide on silica gel, 12-tungstosilicic acid on silica gel, and titania, at a temperature of from about 240°C. to about 360°C.

20. The process of claim 19 wherein the pyrolysis is conducted at a temperature of from about 270°C. to about 310°C.

21. The process of claim 19 wherein the pyrolysis is conducted at atmospheric pressure.

22. The process of claim 19 wherein the pyrolysis is conducted at reduced pressure.

* * * * *